(12) United States Patent
Tateishi

(10) Patent No.: US 12,015,586 B2
(45) Date of Patent: Jun. 18, 2024

(54) INFORMATION PROCESSING APPARATUS, INFORMATION PROCESSING SYSTEM, AND NON-TRANSITORY COMPUTER READABLE MEDIUM STORING PROGRAM

(71) Applicant: FUJIFILM Business Innovation Corp., Tokyo (JP)

(72) Inventor: Koji Tateishi, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 359 days.

(21) Appl. No.: 17/400,073

(22) Filed: Aug. 11, 2021

(65) Prior Publication Data
US 2022/0263795 A1    Aug. 18, 2022

(30) Foreign Application Priority Data
Feb. 16, 2021 (JP) ................. 2021-022425

(51) Int. Cl.
*H04L 51/42* (2022.01)
*H04L 101/37* (2022.01)

(52) U.S. Cl.
CPC .......... *H04L 51/42* (2022.05); *H04L 2101/37* (2022.05)

(58) Field of Classification Search
None
See application file for complete search history.

(56) References Cited

U.S. PATENT DOCUMENTS

| | | | |
|---|---|---|---|
| 2009/0195708 A1* | 8/2009 | Yada | H04L 51/00 348/744 |
| 2009/0228564 A1* | 9/2009 | Hamburg | H04L 51/18 709/206 |
| 2019/0097816 A1* | 3/2019 | De Luca | H04L 51/10 |

FOREIGN PATENT DOCUMENTS

| | | |
|---|---|---|
| JP | H07142959 | 6/1995 |
| JP | H08339352 | 12/1996 |

OTHER PUBLICATIONS

Opazo et al., "Email trouble: Secrets of spoofing, the dangers of social engineering, and how we can help", Jul. 1, 2017, IEEE, 2017 13th International Conference on Natural Computation, Fuzzy Systems and Knowledge Discovery (ICNC-FSKD) (pp. 2812-2817) (Year: 2017).*

* cited by examiner

*Primary Examiner* — Davoud A Zand
(74) *Attorney, Agent, or Firm* — JCIPRNET

(57) ABSTRACT

An information processing apparatus includes a processor configured to receive a first e-mail, generate a document including content in a body of the first e-mail, generate address information for accessing the document, send a second e-mail to an e-mail address designated as an addressee of the first e-mail, the second e-mail including the address information and only a portion of the content in the body of the first e-mail, and in a case where an address indicated by the address information is accessed by a user of the addressee, display the document on a display of the addressee user.

6 Claims, 11 Drawing Sheets

ADDRESSEE: MR. AAA
CC: MR. BBB

SUBJECT: PRODUCT MEETING (HELD ON DECEMBER 20)
ATTACHED FILE: MAP TO VENUE.pptx

BODY:
DEAR AAA
THANK YOU FOR YOUR COOPERATION. THIS IS DDD
FROM CCC COOPERATION.

I'D LIKE TO INFORM YOU ABOUT NEXT MEETING.
   DATE/TIME: DECEMBER 20 14:00 TO 15:00
   VENUE: PLEASE REFER TO ATTACHED FILE
THANK YOU.

REGARDS

ADDRESSEE: MR. AAA
CC: MR. BBB

SUBJECT: PRODUCT MEETING (HELD ON DECEMBER 20)

BODY:
DEAR AAA
THANK YOU FOR YOUR COOPERATION. THIS IS DDD FROM CCC COOPERATION

I'D LIKE TO INFORM YOU ABOUT NEXT MEETING.
    DATE/TIME: DECEMBER 20 14:00 TO 15:00
    VENUE: PLEASE REFER TO ATTACHED FILE
THANK YOU.

REGARDS

MAP

```
48
┌─────────────────────────────────────────────┐
│ URL: http://aaa.bbb.co.jp/f9deiowail5m32f   │
│                                             │
│ ACCESS ID: 3f84mt8gh3                       │
│                                             │
│ * ACCESS PASSWORD WILL BE SENT SEPARATELY.  │
└─────────────────────────────────────────────┘
```

FIG. 9

```
50
┌─────────────────────────────────────────────┐
│ URL: http://aaa.bbb.co.jp/f9deiowail5m32f   │
│                                             │
│ ACCESS ID: f3489hrga                        │
│                                             │
│ * ACCESS PASSWORD WILL BE SENT SEPARATELY.  │
└─────────────────────────────────────────────┘
```

FIG. 10

```
                                                    52
┌─────────────────────────────────────────────────┐
│  ┌──────────────────────────────────────────┐   │
│  │ http://aaa.bbb.co.jp/f9deiowail5m32f     │   │
│  └──────────────────────────────────────────┘   │
│                                                 │
│   ACCESS ID         ┌────────────────────┐      │
│                     └────────────────────┘      │
│                                                 │
│   ACCESS PASSWORD   ┌────────────────────┐      │
│                     └────────────────────┘      │
│                                                 │
│   ┌───────┐      ┌──────┐       ┌────────┐      │
│   │ REFER │      │  OK  │       │ CANCEL │      │
│   └───────┘      └──────┘       └────────┘      │
└─────────────────────────────────────────────────┘
```

FIG. 13

PREVIOUS GUIDANCE WAS INCORRECT.
THERE WAS AN ERROR IN INFORMATION EARLIER.
I'M SORRY. PLEASE REFER TO FOLLOWING FOR CHANGES.
    【CORRECTION PART】
DATE/TIME: DECEMBER 20 14:00 TO 15:00
    ↓
DATE/TIME: DECEMBER 20 14:30 TO 15:30 — 66

PLEASE DOWNLOAD AND RE-ACQUIRE REPLACEMENT VERSION OF FILE. — 68

ADDRESSEE: MR. AAA
CC: MR. BBB

SUBJECT: PRODUCT MEETING (HELD ON DECEMBER 20)

BODY:
DEAR AAA
THANK YOU FOR YOUR COOPERATION. THIS IS DDD FROM CCC COOPERATION.

I'D LIKE TO INFORM YOU ABOUT NEXT MEETING.
    DATE/TIME: DECEMBER 20 14:30 TO 15:30
    VENUE: PLEASE REFER TO ATTACHED FILE
THANK YOU.

REGARDS

[MAP 2] — 64 — 62

ADDRESSEE: MR. AAA
CC: MR. BBB

SUBJECT: PRODUCT MEETING (HELD ON DECEMBER 20)

BODY:
DEAR AAA
THANK YOU FOR YOUR COOPERATION. THIS IS DDD FROM CCC COOPERATION.

I'D LIKE TO INFORM YOU ABOUT NEXT MEETING.
    DATE/TIME: DECEMBER 20 14:30 TO 15:30
    VENUE: PLEASE REFER TO ATTACHED FILE
THANK YOU.

REGARDS

[ MAP 2 ]
64

INFORMATION PROCESSING APPARATUS, INFORMATION PROCESSING SYSTEM, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2021-022425 filed Feb. 16, 2021.

BACKGROUND

(i) Technical Field

The present invention relates to an information processing apparatus, an information processing system, and a non-transitory computer readable medium storing a program.

(ii) Related Art

Techniques for suppressing erroneous sending of e-mails are known. For example, a technique is known in which e-mails can be sent only to the e-mail addresses included in the list, a warning is displayed before sending, e-mails can be sent in a case where approval of sending is obtained, or an addressee user of the e-mail deletes an e-mail from a mail server before receiving the e-mail.

In JP1996-339352A, an apparatus is described which stores an access right table in which an access right specified for each item included in unique information is registered, selects the indicated access right table, and selects and outputs only the unique information items that can be accessed in the selected access right table, from among the unique information items.

SUMMARY

Incidentally, even in a case where one or more techniques for suppressing erroneous sending of e-mails are used, erroneous sending of e-mails may not necessarily be prevented.

Aspects of non-limiting embodiments of the present disclosure relate to an information processing apparatus, an information processing system, and a non-transitory computer readable medium storing a program that make an addressee user receive an e-mail that does not include the content described by a source user as it is, by the same operation as normal e-mail sending in which the source user of the e-mail describes the content in the body of the e-mail, designates the e-mail address of an addressee, and sends the e-mail.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to receive a first e-mail, generate a document including content in a body of the first e-mail, generate address information for accessing the document, send a second e-mail to an e-mail address designated as an addressee of the first e-mail, the second e-mail including the address information and only a portion of the content in the body of the first e-mail, and in a case where an address indicated by the address information is accessed by user of the addressee, display the document on a display of the addressee user.

BRIEF DESCRIPTION OF THE DRAWINGS

Exemplary embodiment(s) of the present invention will be described in detail based on the following figures, wherein:

FIG. 6 is a diagram illustrating content of a first e-mail;

FIG. 7 is a diagram illustrating a document;

FIG. 8 is a diagram illustrating content of a second e-mail;

FIG. 9 is a diagram illustrating the content of the second e-mail;

FIG. 10 is a screen for inputting an access ID and an access password;

FIG. 13 is a diagram illustrating content of an e-mail notifying the correction of the document; and FIG. 14 is a diagram illustrating a corrected document.

DETAILED DESCRIPTION

Figure 1:
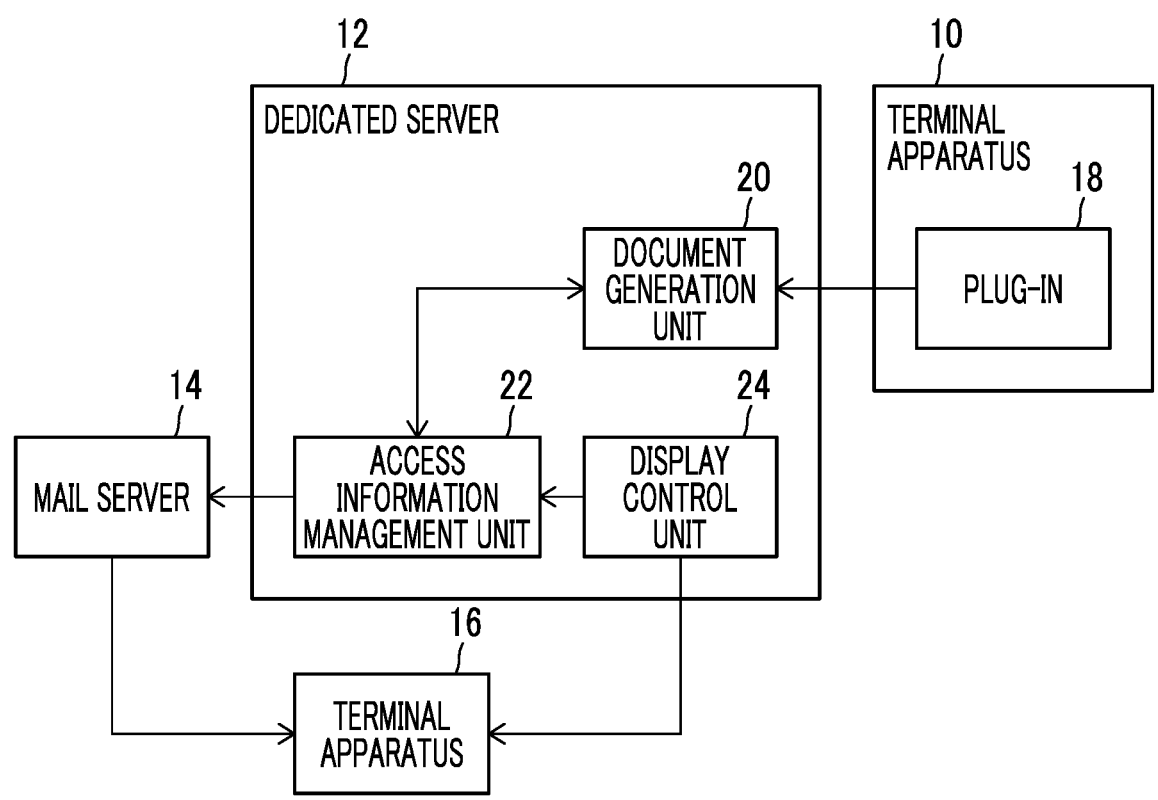
FIG. 1 is a block diagram illustrating a configuration of an information processing system according to the present exemplary embodiment.

An information processing system according to the present exemplary embodiment will be described with reference to FIG. 1. FIG. 1 illustrates an example of the configuration of the information processing system according to the present exemplary embodiment.

As an example, the information processing system according to the present exemplary embodiment includes a terminal apparatus 10, a dedicated server 12, a mail server 14, and a terminal apparatus 16. The number of each device is only an example, and a plurality of terminal apparatuses, a plurality of mail servers, and the like may be included in the information processing system.

In the present exemplary embodiment, the terminal apparatus 10 is the source apparatus of an e-mail (that is, an apparatus used by the source user of the e-mail), and the terminal apparatus 16 is the apparatus of the destination of an e-mail (that is, an apparatus used by the addressee user of the e-mail). Of course, the terminal apparatus 10 may receive the e-mail and the terminal apparatus 16 may send the e-mail.

The terminal apparatus 10 (16) is, for example, a personal computer (hereinafter referred to as "PC"), a tablet PC, a smartphone, or a mobile phone.

A plug-in 18 is mounted on the source terminal apparatus 10. The plug-in 18 is, for example, a program, and the function of the plug-in 18 is achieved by the program being executed by the processor. The plug-in 18 has a function of changing the destination of the e-mail from the mail server 14 to the dedicated server 12 and sending the e-mail to the dedicated server 12.

The dedicated server 12 is an example of an information processing apparatus, and includes a document generation unit 20, an access information management unit 22, and a display control unit 24.

The document generation unit 20 receives the e-mail sent from the terminal apparatus 10 and generates a document including the content in the body of the e-mail.

The e-mail includes, for example, a header part and a body which are stylized parts. The header part includes, for example, information indicating the addressee of an e-mail (for example, the name and e-mail address of the addressee), information indicating the source (for example, the name and e-mail address of the source), information indicating the subject, and information regarding the structure of the e-mail. In the body, a text string such as a message is described by the source user.

The document generated by the document generation unit 20 may include all or part of the information included in the header unit in addition to the content in the body of the e-mail.

The document according to the present exemplary embodiment is, for example, an HTML format web page, a text file, a rich text file, a PDF format file, or the like. The document includes, for example, text strings, images (for example, images in bitmap format or images in vector format), and figures. In the document, only the text string may be described, the image may be disposed together with the text string, or only the image may be disposed.

The access information management unit 22 generates access information regarding the document generated by the document generation unit 20, and manages the user who has accessed the document and the history of operations on the document. Examples of the access information include the address information for accessing the document, the e-mail address of the addressee of the e-mail, the authentication information required when accessing the document (for example, the access ID and the access password), history information indicating the history of the operations on the document, and the like. The address information is information indicating the location of the document (for example, information indicating the address of the storage area in which the data on the document is stored). For example, in a case where the document is a Web page, the address information is the URL of the Web page.

Further, the access information management unit 22 sends, to an e-mail address designated as an addressee of the e-mail, an e-mail including the address information and including not all the content in the body of the e-mail, to the e-mail address designated as the addressee of the e-mail via the mail server 14.

Including not all the content in the body of the e-mail means not including the content in the body as it is, for example, the content of the entire body may not be included at all (that is, the content in the body may not be partly included and the content in the body may not be included at all) or the content of a part of the body may not be included (that is, the content of a part of the body may be included).

In a case where the address indicated by the address information is accessed by the addressee user of the e-mail, the display control unit 24 displays the document on the display of the terminal apparatus 16 used by the addressee user. For example, in a case where the document is a Web page and the address information is the URL of the Web page, in a case where the addressee user operates the terminal apparatus 16 to access the URL, the display control unit 24 displays the Web page, on the display of the terminal apparatus 16. In this case, the display control unit 24 may be a Web server.

The mail server 14 receives the e-mail and sends the e-mail to the addressee. The mail server 14 is, for example, a known mail server.

Figure 2:
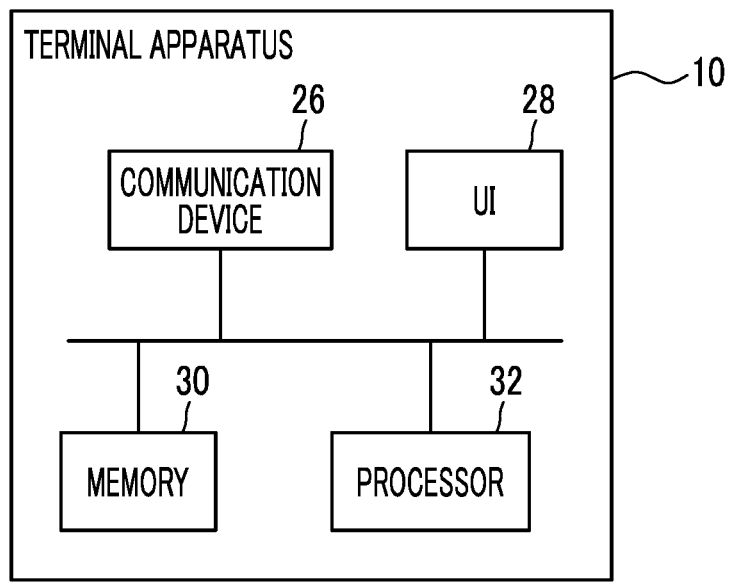
FIG. 2 is a block diagram illustrating a configuration of a terminal apparatus according to the present exemplary embodiment.

Hereinafter, the hardware configuration of the terminal apparatus 10 will be described with reference to FIG. 2. FIG. 2 illustrates an example of the hardware configuration of the terminal apparatus 10. The terminal apparatus 16 also has the same hardware configuration as the terminal apparatus 10.

The terminal apparatus 10 includes, for example, a communication device 26, a UI 28, a memory 30, and a processor 32.

The communication device 26 is a communication interface having a communication chip, a communication circuit, and the like, and has a function of transmitting information to other apparatuses and a function of receiving information transmitted from other apparatuses. The communication device 26 may have a wireless communication function or may have a wired communication function.

The UI 28 is a user interface and includes at least one among a display and an operation device. The display is a display device such as a liquid crystal display or an EL display. The operation device is a keyboard, input keys, an operation panel, or the like. The UI 28 may be a UI such as a touch panel that has both a display and an operation device.

The memory 30 is a device that constitutes one or a plurality of storage areas for storing various types of information. The memory 30 is, for example, a hard disk drive, various types of memory (for example, a RAM, a DRAM, a ROM, or the like), other storage devices (for example, optical disk, or the like), or a combination thereof. One or a plurality of memories 30 are included in the terminal apparatus 10. For example, a plug-in 18 (that is, a program that achieves the function of the plug-in 18) is stored in the memory 30 of the source terminal apparatus 10.

The processor 32 is configured to control the operation of each unit of the terminal apparatus 10. The processor 32 may have a memory. For example, the function of the plug-in 18 is achieved by executing the plug-in 18 by the processor 32. The processor 32 corresponds to an example of the first processor.

Figure 3:
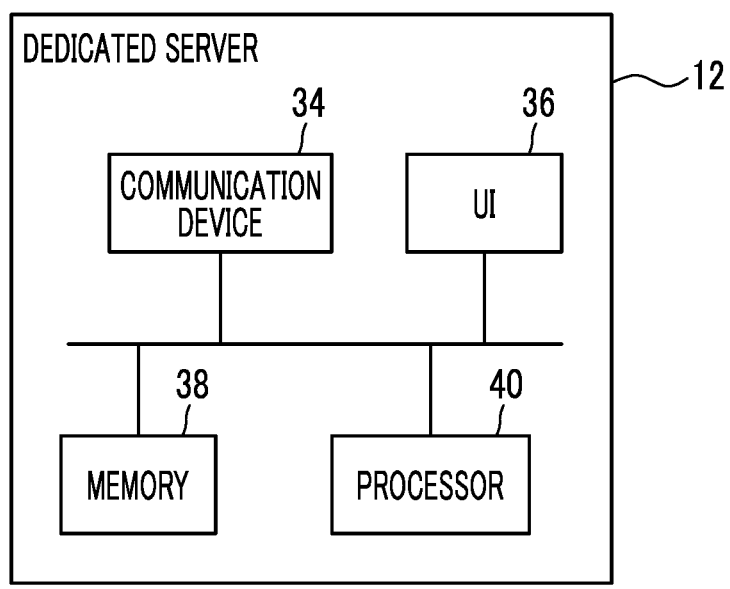
FIG. 3 is a block diagram illustrating a configuration of a dedicated server according to the present exemplary embodiment.

Hereinafter, the hardware configuration of the dedicated server 12 will be described with reference to FIG. 3. FIG. 3 illustrates an example of the hardware configuration of the dedicated server 12.

The dedicated server 12 includes, for example, a communication device 34, a UI 36, a memory 38, and a processor 40.

The communication device 34 is a communication interface having a communication chip, a communication circuit, and the like, and has a function of transmitting information to other apparatuses and a function of receiving information transmitted from other apparatuses. The communication device 34 may have a wireless communication function or may have a wired communication function.

The UI 36 is a user interface and includes at least one among a display and an operation device. The display is a display device such as a liquid crystal display or an EL display. The operation device is a keyboard, input keys, an operation panel, or the like. The UI 36 may be a UI such as a touch panel that has both a display and an operation device.

The memory 38 is a device that constitutes one or a plurality of storage areas for storing various types of information. The memory 38 is, for example, a hard disk drive, various types of memory (for example, a RAM, a DRAM, a ROM, or the like), other storage devices (for example, optical disk, or the like), or a combination thereof. One or a plurality of memories 38 are included in the dedicated server 12.

The processor 40 is configured to control the operation of each unit of the dedicated server 12. The processor 40 may have a memory. For example, the functions of the document generation unit 20, the access information management unit 22, and the display control unit 24 are achieved by the processor 40 executing a program. The program is stored in, for example, the memory 38. The processor 40 corresponds to an example of the second processor.

Figure 4:
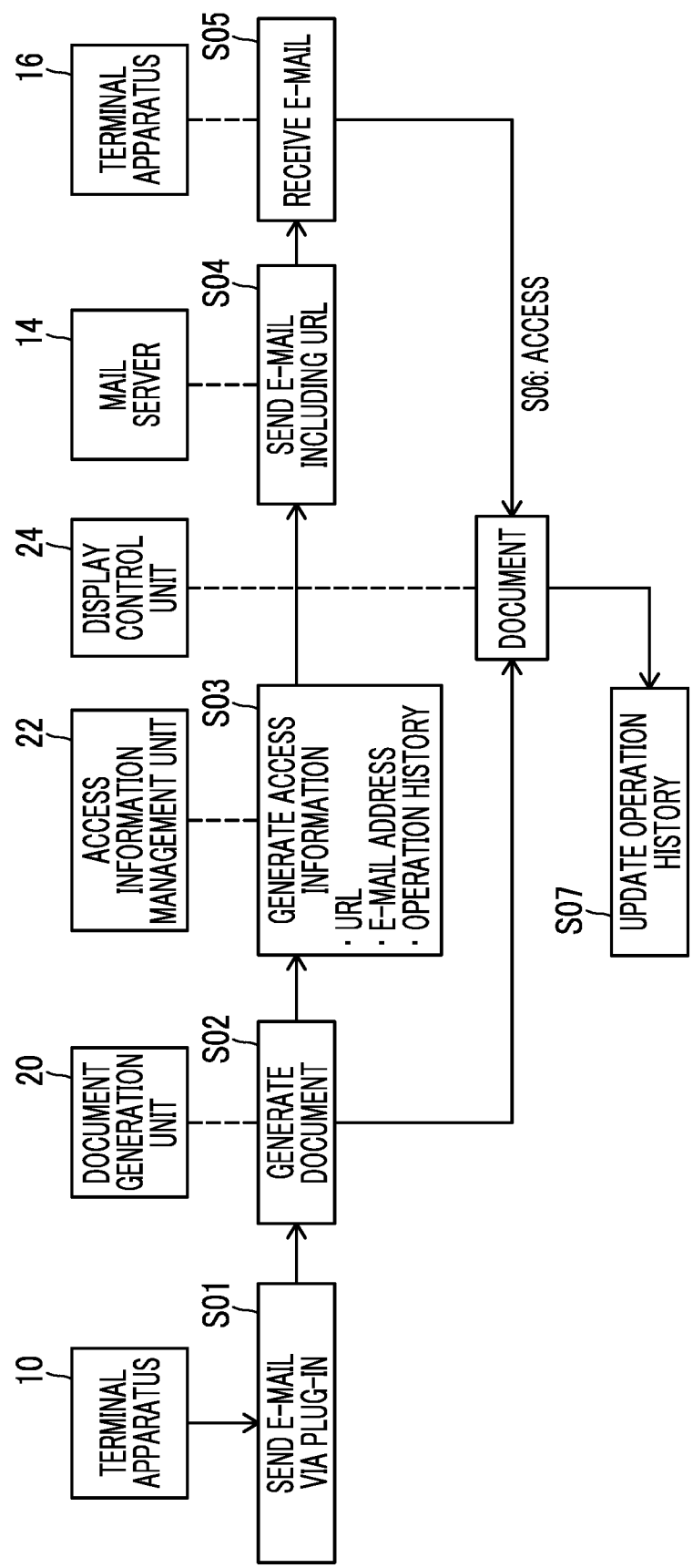
FIG. 4 is a sequence diagram illustrating a processing flow according to the present exemplary embodiment.

Hereinafter, with reference to FIG. 4, the processing flow by the information processing system according to the present exemplary embodiment will be described. FIG. 4 is a sequence diagram illustrating the processing flow.

First, the user who is the source of the e-mail operates the terminal apparatus 10 to describe the content in the body of the e-mail, designates the e-mail address of the addressee, and instructs the sending of the e-mail. This operation is similar to the operation of the normal e-mail sending. Further, a file such as a document may be attached to the e-mail. Hereinafter, the e-mail sent here will be referred to as a "first e-mail".

In a case where the source user instructs the sending of the first e-mail, the plug-in 18 of the terminal apparatus 10 sends the first e-mail to the dedicated server 12 (S01). That is, the first e-mail is sent to the dedicated server 12 without being sent to the normal mail server 14.

Next, the document generation unit 20 of the dedicated server 12 receives the first e-mail sent from the terminal apparatus 10 and generates a document including the content in the body of the first e-mail (S02). For example, the document generation unit 20 generates a Web page including the content in the body of the first e-mail.

Next, the access information management unit 22 generates access information for the document generated by the document generation unit 20 (S03). The access information includes the address of the document generated by the document generation unit 20 (for example, the URL of the Web page), the e-mail address of the addressee of the first e-mail, the access ID, the access password, and the operation history information.

Next, the access information management unit 22 sends an e-mail (hereinafter, referred to as "second e-mail") including the address information on the document (for example, the URL of the Web page) and including not all the content in the body of the first e-mail, to the e-mail address of the addressee of the first e-mail, via the mail server 14 (S04).

The processor of the addressee terminal apparatus 16 receives the second e-mail from the mail server 14 (S05).

The address information on the document (for example, the URL of the Web page) is described in the second e-mail, and in a case where the addressee user operates the terminal apparatus 16 to access the address (for example, the URL of the Web page) indicated by the address information (S06), the display control unit 24 displays the document (for example, the Web page designated by the URL) present at the address, on the display of the terminal apparatus 16. The addressee user can view the displayed document or perform other operations on the document. On the other hand, since the second e-mail does not include all the content in the body of the first e-mail, only in a case where the addressee user accesses the address indicated by the address information, the display control unit 24 does not display all the content in the body of the first e-mail on the display.

In a case where the addressee user accesses the document, the access information management unit 22 adds information indicating that the addressee user has accessed the document to the operation history information included in the access information on the document, and updates the history information (S07). For example, the access information management unit 22 adds information indicating when and which addressee user has accessed the document, to the history information on the document. Further, the access information management unit 22 may add information indicating an operation performed on the document by the addressee user who has accessed the document, to the history information on the document.

Figure 5:
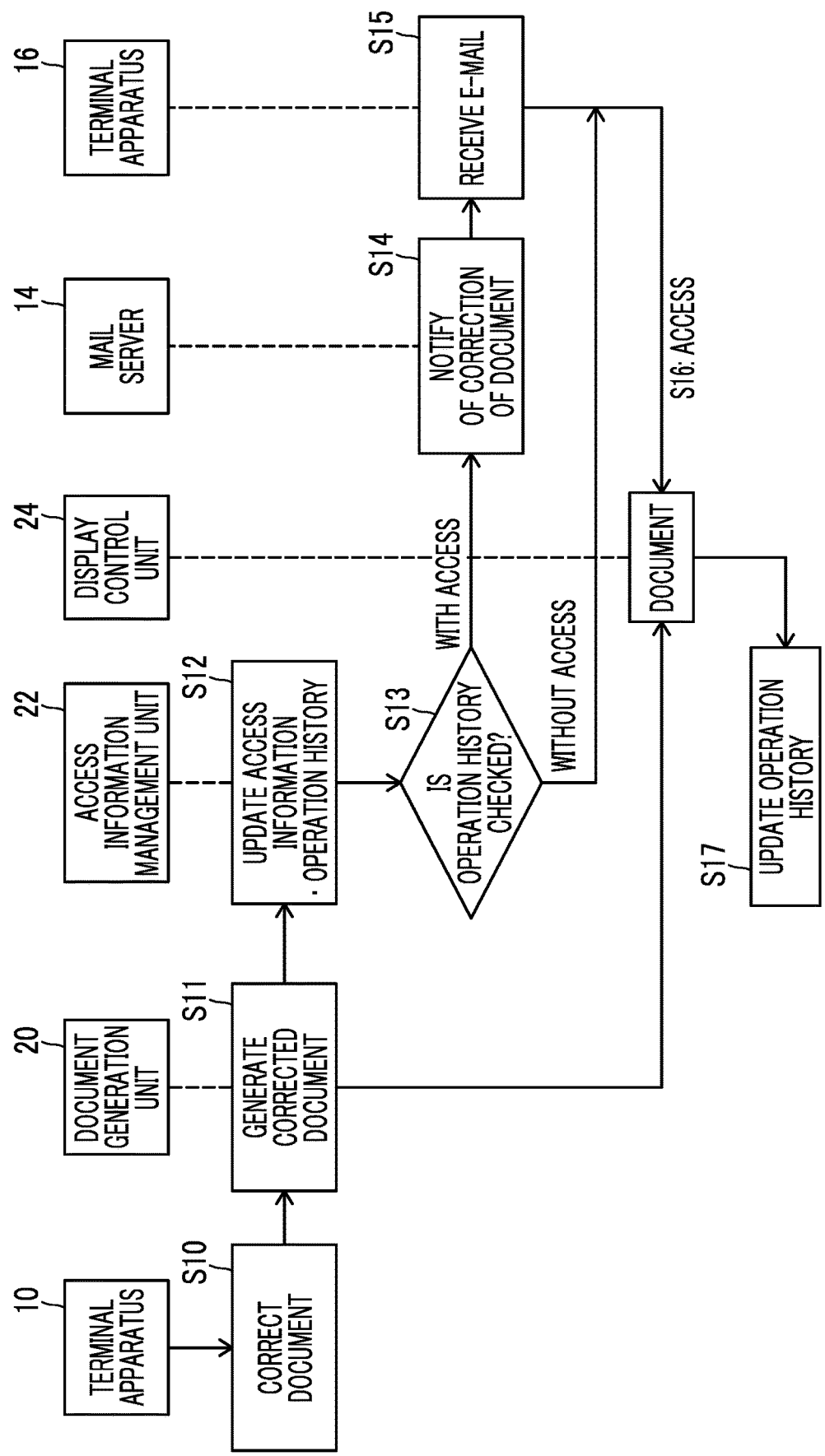
FIG. 5 is a sequence diagram illustrating a processing flow according to the present exemplary embodiment.

Hereinafter, a process in the case where the document is corrected will be described with reference to FIG. 5. FIG. 5 is a sequence diagram illustrating the processing flow.

First, the source user of the first e-mail corrects the above document including the content in the body of the first e-mail (S10). For example, in a case where there is an error in the content in the body of the first e-mail, the error may be corrected. The source user operates the terminal apparatus 10 to request the dedicated server 12 to correct the document, and corrects the document, for example, on the correction screen. In a case where a file is attached to the first e-mail, the file may be exchanged with another file, or a new file may be attached.

The document generation unit 20 of the dedicated server 12 corrects the document in accordance with the correction instruction from the source user to generate a document reflecting the correction (hereinafter, referred to as "corrected document") (S11). For example, in a case where the document is a Web page, the Web page is corrected and a corrected Web page is generated.

In a case where the document is corrected and the corrected document is generated, the access information on the uncorrected document is linked to the corrected document as the access information on the corrected document. Even in a case where the document is corrected, the address information does not change. Therefore, the corrected document can be accessed by accessing the address (for example, URL) indicated by the address information.

In a case where the document is corrected, the access information management unit 22 updates the operation history information included in the access information on the corrected document (S12). Here, the access information management unit 22 adds information indicating that the document has been corrected to the history information. In a case where the document is a Web page, the access information management unit 22 adds information indicating that the Web page has been corrected to the history information included in the access information on the Web page, and updates the history information.

Next, the access information management unit 22 refers to the operation history information included in the access information on the corrected document, and checks whether or not there is an addressee user who has accessed the uncorrected document (for example, the Web page before correction) (S13).

In a case where there is an addressee user who has accessed the uncorrected document (S13, with access), after correction of the document, the access information management unit 22 notifies only the addressee user who has accessed the uncorrected document that the document has been corrected (S14). For example, the access information management unit 22 sends an e-mail including information indicating that the document has been corrected to the e-mail address of the addressee user who has accessed the uncorrected document, via the mail server 14. The access information management unit 22 does not notify the addressee user who has not accessed the uncorrected document that the document has been corrected.

The processor of the addressee terminal apparatus 16 receives an e-mail including information indicating that the document has been corrected (S15).

In a case where the addressee user operates the terminal apparatus 16 to access the address (for example, URL) of the corrected document (S16), the display control unit 24 displays the corrected document (for example, the corrected Web page designated by the URL) present at the address, on the display of the terminal apparatus 16. The address of the corrected document is the address described in the previously-sent second e-mail. The addressee user can view the displayed document or perform other operations on the document.

In a case where the addressee user accesses the corrected document, the access information management unit 22 adds information indicating that the addressee user has accessed the corrected document to the operation history information included in the access information on the corrected document, and updates the history information (S17).

In a case where there is no addressee user who has accessed the uncorrected document (S13, without access), the access information management unit 22 does not notify the addressee user that the document has been corrected. That is, in a case where all the addressee users of the first e-mail do not access the uncorrected document, the access information management unit 22 does not notify the addressee user that the document has been corrected.

After the document has been corrected, in a case where the addressee user, who has not accessed the uncorrected document, accesses the address described in the second e-mail by operating the terminal apparatus 16, the display control unit 24 displays the corrected document on the display of the terminal apparatus 16. In this way, the user who has not accessed the uncorrected document is not provided with the uncorrected document, but is provided with the corrected document.

Hereinafter, the process illustrated in FIG. 4 will be described with reference to a specific example.

First, the source user ZZZ of the first e-mail operates the terminal apparatus 10 to describe the content in the body of the first e-mail, designates the e-mail address of the addressee, and instructs the sending of the first e-mail. Here, as an example, it is assumed that an e-mail is sent to two users (for example, a user AAA and a user BBB). The user ZZZ designates the respective e-mail addresses of the users AAA and BBB, and instructs the sending of the first e-mail.

FIG. 6 illustrates the content of the first e-mail 42. The e-mail address of the user AAA is designated as the addressee, and the e-mail address of the user BBB is designated as the carbon copy (CC) included in the concept of the addressee.

In addition, the subject and the content in the body are described in the first e-mail 42. The subject is "Product meeting", and the content in the body is to inform the addressee user of the date and time of the meeting and the venue. Further, a map file for the venue is attached to the first e-mail 42.

In a case where the user ZZZ instructs the sending of the first e-mail 42, the plug-in 18 of the terminal apparatus 10 sends the first e-mail 42 to the dedicated server 12. That is, the first e-mail 42 is not sent to the users AAA and BBB via the mail server 14, but is sent to the dedicated server 12.

In a case of receiving the first e-mail 42 from the terminal apparatus 10, the document generation unit 20 of the dedicated server 12 generates a document including the content in the body of the first e-mail 42. Here, as an example, the document generation unit 20 generates a Web page including the content in the body of the first e-mail 42.

FIG. 7 illustrates a Web page 44 generated by the document generation unit 20. The Web page 44 is an example of a document including the content in the body of the first e-mail 42. In the example illustrated in FIG. 7, in addition to the content in the body, the addressee, CC, and subject are also described on the Web page 44. Further, the map file 46 attached to the first e-mail 42 is disposed on the Web page 44 in a downloadable state. For example, a hyperlink to the file 46 is described on the Web page 44, and the file 46 is downloaded by accessing the hyperlink. The data on the Web page 44 is stored in the dedicated server 12 or another apparatus.

Next, the access information management unit 22 generates access information for the Web page 44. The access information includes the URL of the Web page 44, the e-mail address of the addressee of the first e-mail (for example, the e-mail address of each of the user AAA and BBB), the access ID, the access password, and the operation history information. The URL, access ID, and access password of the Web page 44 are generated by the access information management unit 22. The access information on the Web page 44 is stored in the dedicated server 12.

The access ID is an ID corresponding to a combination of the URL of the Web page 44 and the e-mail address of the addressee. For example, an access ID is generated for each addressee e-mail address (that is, for each addressee user). Specifically, an access ID for the user AAA and an access ID for the user BBB are generated.

The access password is a password corresponding to the access ID. In a case where an access ID is generated for each addressee e-mail address, in correspondence with this generation, an access password is generated for each addressee e-mail address.

The combination of the access ID and the access password is required when the Web page 44 is accessed. In case where the combination of the access ID and the access password that matches the combination of the access ID and the access password included in the access information for the web page 44 is input, the access to the web page 44 is permitted and the web page 44 is displayed.

An access ID and an access password may not be generated for each addressee e-mail address, but an access ID and an access password common to all addressee users may be generated.

The operation history information includes information indicating a history of operations performed by the user thereafter. For example, information indicating that the source user ZZZ has corrected the Web page 44, information indicating that the addressee user has accessed the Web page 44, information indicating that the addressee user has viewed the Web page 44, and information indicating that the addressee user has downloaded the file 46, and the like are included in the history information.

Further, the access information management unit 22 sends the second e-mail including the URL of the Web page 44 and including not all the content in the body of the first e-mail 42, to the e-mail address of the addressee of the first e-mail 42, via the mail server 14. Here, the second e-mail is sent to the e-mail address of each of the users AAA and BBB.

FIG. 8 illustrates the content of the second e-mail sent to the e-mail address of the user AAA. FIG. 9 illustrates the content of the second e-mail 50 sent to the e-mail address of the user BBB.

As illustrated in FIGS. 8 and 9, the same URL is described in the second e-mails 48 and 50. This URL is the URL of the Web page 44.

The access ID for the user AAA is described in the second e-mail 48 addressed to the user AAA, and the access ID for the user BBB is described in the second e-mail 50 addressed to the user BBB. The access ID for the user AAA and the access ID for the user BBB are different access IDs.

In the examples illustrated in FIGS. 8 and 9, the access passwords are sent to the users AAA and BBB by separate e-mails, respectively. The access password for the user AAA is a password corresponding to the access ID for the user AAA. The access password for the user BBB is a password corresponding to the access ID for the user BBB.

In the examples illustrated in FIGS. 8 and 9, the content in the body of the first e-mail 42 is not included in the second e-mails 48 and 50 at all. That is, a part of the content in the body of the first e-mail 42 is not included in the second e-mails 48 and 50. As another example, a part of the content in the body, subject, and addressee of the first e-mail 42 may be included in the second e-mails 48 and 50.

The access information on the Web page 44 includes information on the user AAA and information on the user BBB.

The information on the user AAA when the second e-mail 48 is sent to the e-mail address of the user AAA includes the following content.

URL of Web page 44: http://aaa.bbb.co.jp/f9deiowail5m32f
 E-mail address: E-mail address of user AAA
 Access ID for user AAA: 3f84mt8gh3
 Access password for user AAA: Text string corresponding to access ID "3f84mt8gh3"
 Operation history: None At this point, since the user AAA does not access the Web page 44, does not view the Web page 44, or does not download the file 46, the operation history is "None".

The information on the user BBB when the second e-mail 50 is sent to the e-mail address of the user BBB includes the following content.

URL of Web page 44: http://aaa.bbb.co.jp/f9deiowail5m32f
 E-mail address: E-mail address of user BBB
 Access ID for user BBB: f3489hrga
 Access password for user AAA: Text string corresponding to access ID "f3489hrga"
 Operation history: None At this point, since the user BBB does not access the Web page 44, does not view the Web page 44, or does not download the file 46, the operation history is "None".

The terminal apparatus 16 of the user AAA receives the second e-mail 48 from the mail server 14. Similarly, the terminal apparatus 16 of the user BBB receives the second e-mail 50 from the mail server 14.

In the following, it is assumed that the user AAA accesses the Web page 44 and the user BBB does not access the Web page 44.

By operating the terminal apparatus 16, the user AAA accesses the URL of the Web page 44, described in the second e-mail 48.

In a case where the URL of the Web page 44 is accessed, the screen 52 illustrated in FIG. 10 is displayed on the display of the terminal apparatus 16 of the user AAA. The screen 52 is a screen for inputting an access ID and an access password.

In a case where the user AAA inputs the access ID and the access password for the user AAA on the screen 52 and presses the OK button, the combination of the access ID and the access password input here is transmitted to the dedicated server 12. The access information management unit 22 permits the user AAA to access a Web page having access information including a combination of the input access ID and access password. For example, the access information management unit 22 checks whether or not the combination of the input access ID and access password is included in the access information on the Web page 44. In a case where the combination of the input access ID and access password is included in the access information on the web page 44, the access information management unit 22 permits the user AAA to access the web page 44. In a case where the combination of the input access ID and access password is not included in the access information on the web page 44, the access information management unit 22 does not permit the user AAA to access the web page 44.

In a case where the access to the Web page 44 by the user AAA is permitted, the display control unit 24 displays the Web page 44 on the display of the terminal apparatus 16 of the user AAA. The Web page 44 illustrated in FIG. 7 is displayed on the display. Thus, the user AAA can view the Web page 44.

In addition, the user AAA can download the file 46 by accessing the hyperlink described on the Web page 44.

Here, as an example, it is assumed that the Web page 44 is displayed on the display of the terminal apparatus 16 of the user AAA and the file 46 is downloaded.

The access information management unit 22 updates the operation history information, in response to the operation of the user AAA on the Web page 44.

In a case where the Web page 44 is displayed on the display of the terminal apparatus 16 of the user AAA and the file 46 is downloaded by the user AAA, the information regarding the user AAA included in the history information of the Web page 44 is updated to the following content.

URL of Web page 44: http://aaa.bbb.co.jp/f9deiowail5m32f
 E-mail address: E-mail address of user AAA
 Access ID for user AAA: 3f84mt8gh3
 Access password for user AAA: Text string corresponding to access ID "3f84mt8gh3"
 Operation history: view and download Since the Web page 44 is displayed on the display of the terminal apparatus 16 of the user AAA, the viewing of the Web page 44 is recorded as the operation history of the user AAA. Further, since the file 46 is downloaded by the user AAA, the download of the file is recorded as the operation history of the user AAA. Further, the access information management unit 22 records the date and time when the user AAA accesses the Web page 44 (that is, the date and time when the user AAA starts viewing the Web page 44) and the date and time when the user AAA downloads the file 46, as a history of operations of the user AAA. Information indicating these dates and times is included in the history information on the Web page 44.

Since the user BBB does not access the Web page 44, the information on the user BBB included in the history information on the Web page 44 is not updated.

Hereinafter, the process illustrated in FIG. 5 will be described with reference to a specific example.

First, the source user ZZZ of the first e-mail operates the terminal apparatus 10 to request the dedicated server 12 to correct the Web page 44. In a case where a plurality of first e-mails are sent by the user ZZZ and a plurality of Web pages are generated, and the Web page is corrected, a list of the Web pages is displayed on the display of the terminal apparatus 10, and the user ZZZ selects the Web page to be corrected from the list and requests the correction of the Web page.

Figure 11:
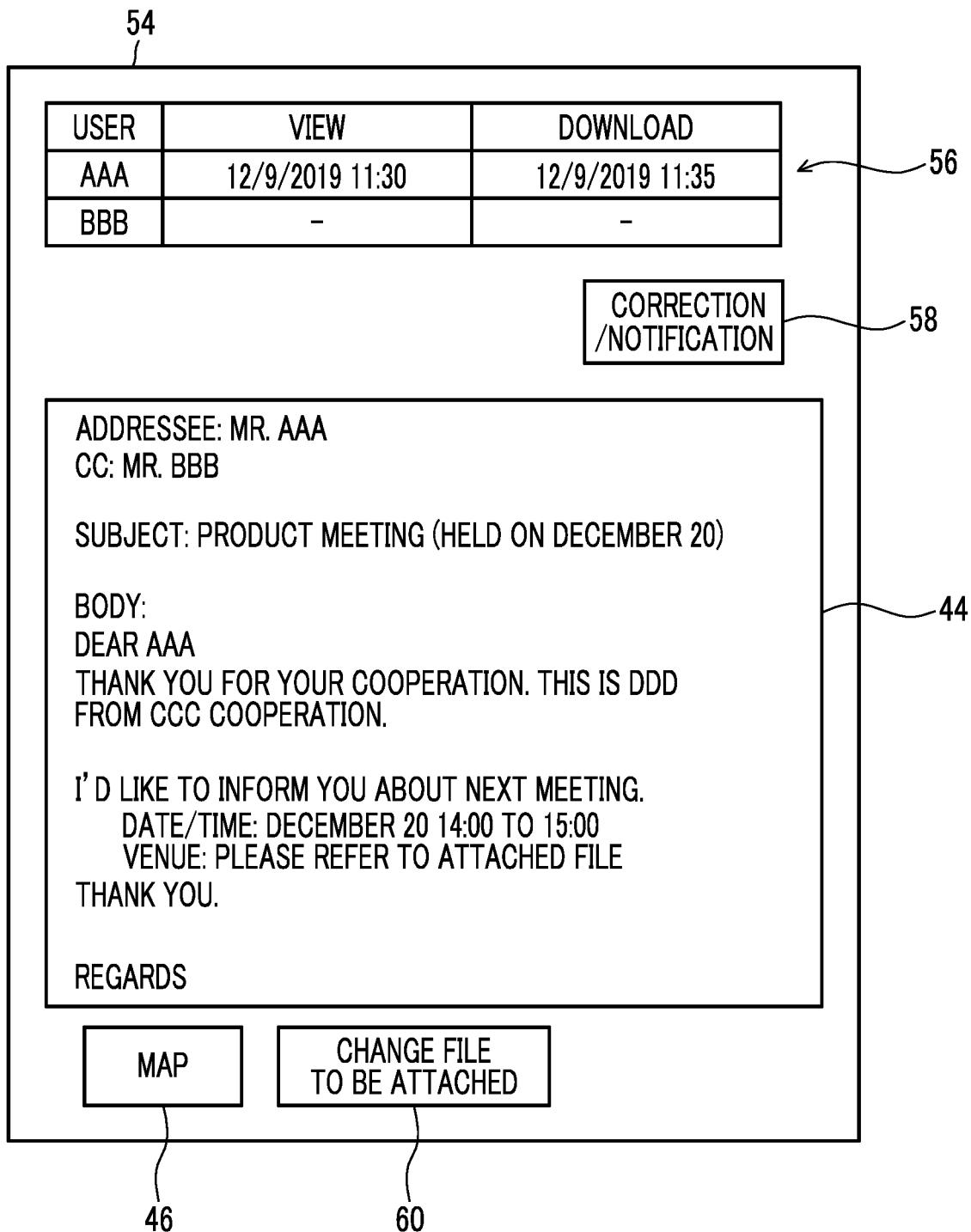
FIG. 11 is a diagram illustrating a screen for correcting a document.

In a case where the user ZZZ requests the correction of the Web page 44, a screen for correcting the Web page 44 is displayed on the display of the terminal apparatus 10. FIG. 11 illustrates an example of the screen 54.

On the screen 54, a list 56 of the operation history for the Web page 44, a button 58 for instructing the correction and the notification of the correction, the Web page 44 to be corrected, the file 46, and a button 60 for instructing the change of the file to be attached are displayed.

As described with reference to FIGS. 6 to 10, the user AAA views the web page 44 and downloads the file 46, and the user BBB does not access the web page 44. In the operation history list 56, the date and time when the user AAA views the Web page 44 and the date and time when the user AAA downloads the file 46 are described.

The user ZZZ can correct the Web page 44, change the file 46 to another file, or delete the file 46, on the screen 54.

Here, as an example, the "date and time" described on the Web page 44 is corrected, and the file 46 is changed to another file.

Figure 12:
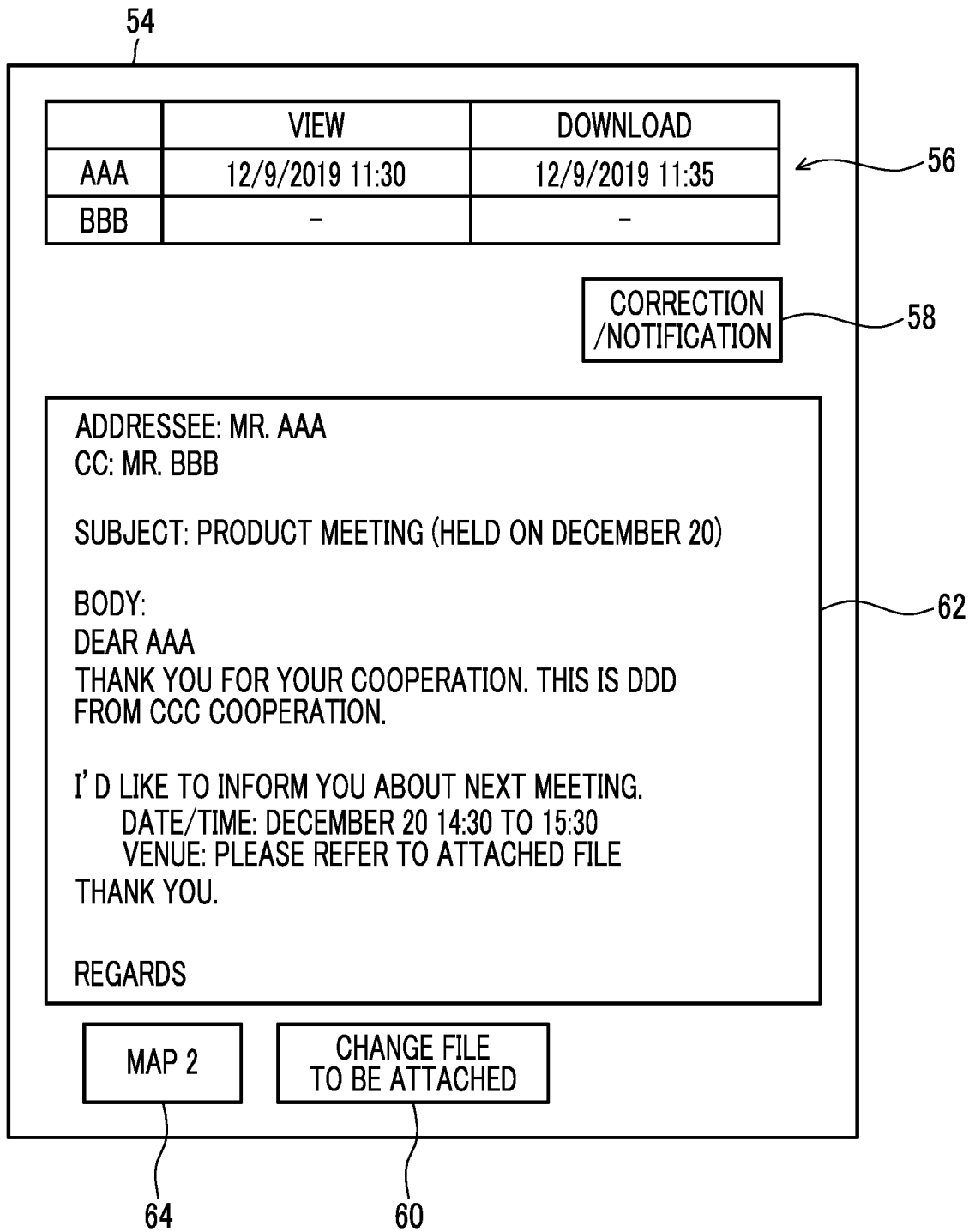
FIG. 12 is a diagram illustrating a screen for correcting a document.

FIG. 12 illustrates the corrected content. The Web page 62 is a Web page that reflects the correction of the "date and time". Specifically, the "date and time" described on the Web page 44 has been corrected from "14:00 to 15:00" to "14:30 to 15:30". Further, the file 46 attached to the Web page 44 has been changed to another file 64. The Web page 62 is an example of a corrected document.

The document generation unit 20 generates the Web page 62 by correcting the Web page 44 according to the correction operation by the user ZZZ, and changes the file 46 to the file 64. The data on the Web page 62 is stored in the dedicated server 12 or another apparatus.

In a case where the Web page 44 is corrected to the Web page 62, the access information on the Web page 44 is directly linked to the Web page 62. The URL for access is not changed, and the URL of the Web page 44 is used as the URL of the Web page 62. The operation history information on the Web page 44 is also included in the access information on the Web page 62.

In a case where the user ZZZ presses the button 58, the access information management unit 22 notifies only the addressee user who has accessed the uncorrected Web page 44 that the Web page 44 has been corrected.

Since the user AAA accesses and views the Web page 44 and downloads the file 46, and the user BBB does not access the Web page 44, the access information management unit 22 sends an e-mail including information indicating that the Web page 44 has been corrected and the file 46 has been changed, to the e-mail address of the user AAA via the mail server 14. The access information management unit 22 does not send the e-mail to the user BBB.

In a case of receiving an e-mail including information indicating that the Web page 44 has been corrected and the file 46 has been changed, the processor of the terminal apparatus 16 of the user AAA displays the content of the e-mail on the display of the terminal apparatus 16. FIG. 13 illustrates the content of the e-mail.

The e-mail describes the corrected part of the Web page 44, as indicated by reference numeral 66. Since the "date and time" has been corrected here, the content of the correction is described. Further, since the unchanged file has been downloaded, a message prompting the re-acquisition of the changed file 64 is described, as indicated by reference numeral 68. The content pointed to by each of the reference numerals 66 and 68 are displayed on the display of the terminal apparatus 16. In a case where the Web page 44 is viewed but the file 46 is not downloaded, the content indicated by the reference numeral 68 is not described.

Further, the corrected Web page 62 is displayed on the display of the terminal apparatus 16 of the user AAA. The Web page 62 may be displayed in a case where the user AAA accesses the URL of the Web page 62 (that is, the URL of the uncorrected Web page 44).

After the Web page 44 is corrected, in a case where the user BBB operates the terminal apparatus 16 to access the URL described in the second e-mail, the screen 52 illustrated in FIG. 10 is displayed on the display of the terminal apparatus 16 of the user BBB. In a case where the user BBB inputs the access ID and the access password for the user BBB on the screen 52 and presses the OK button, the combination of the access ID and the access password input here is transmitted to the dedicated server 12. In a case where the combination of the input access ID and access password is included in the access information on the web page 62, the access information management unit 22 permits the user BBB to access the web page 62. In a case where the combination of the input access ID and access password is not included in the access information on the web page 62, the access information management unit 22 does not permit the user BBB to access the web page 62.

In a case where the access to the Web page 62 by the user BBB is permitted, the display control unit 24 displays the Web page 62 on the display of the terminal apparatus 16 of the user BBB, as illustrated in FIG. 14. The Web page 62 is a Web page to which a correction to the Web page 44 is reflected. Thus, the user BBB can view the corrected Web page 62. For example, the user BBB can view the corrected Web page 62 without recognizing that the uncorrected Web page 44 has been corrected.

Further, the file has been changed from the file 46 to the file 64. Thus, the user BBB can download the changed file 64. For example, the user BBB can download the changed file 64 without recognizing that the file has been changed from the file 46 to the file 64.

The functions of respective units of the terminal apparatuses 10 and 16, the dedicated server 12, and the mail server 14 are achieved by the cooperation of hardware and software as an example. For example, the function of each apparatus is achieved by the processor of each apparatus reading and executing the program stored in the memory of each apparatus. The program is stored in the memory via a recording medium such as a CD or DVD, or via a communication path such as a network.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
 a processor configured to:
  receive a first e-mail;
  generate a document including content in a body of the first e-mail;
  generate address information for accessing the document;
  send a second e-mail to an e-mail address designated as an addressee of the first e-mail, the second e-mail including the address information and only a portion of the content in the body of the first e-mail; and
  in a case where an address indicated by the address information is accessed by a user of the addressee, display the document on a display of the addressee user.

2. The information processing apparatus according to claim 1, wherein the processor is configured to:
 receive a correction on the document from a source user, and
 in a case where the addressee user has accessed the address indicated by the address information, after the correction of the document, display the corrected document on the display of the addressee user.

3. The information processing apparatus according to claim 2, wherein the processor is further configured to:
 store, in a memory, information indicating when and which the addressee user has accessed the document.

4. The information processing apparatus according to claim 3, wherein the processor is configured to:
 after the correction of the document, notify only the addressee user who has accessed the document before correction that the document has been corrected.

5. An information processing system comprising a source terminal apparatus of a first e-mail and a server,
 the terminal apparatus including a first processor,
 the server including a second processor, wherein
 the first processor is configured to:
  send the first e-mail to the server having a different address from an e-mail address designated as an addressee of the first e-mail by a source user, and
 the second processor is configured to:
  receive the first e-mail,
  generate a document including content in a body of the first e-mail,
  generate address information for accessing the document,
  send a second e-mail to an e-mail address designated as an addressee of the first e-mail, the second e-mail including the address information and only a portion of the content in the body of the first e-mail, and
  in a case where an address indicated by the address information is accessed by a user of the addressee, display the document on a display of the addressee user.

6. A non-transitory computer readable medium storing a program causing a computer to execute a process comprising:
 receiving a first e-mail;
 generating a document including content in a body of the first e-mail;
 generating address information for accessing the document;
 sending a second e-mail to an e-mail address designated as an addressee of the first e-mail, the second e-mail including the address information and only a portion of the content in the body of the first e-mail; and
 in a case where an address indicated by the address information is accessed by a user of the addressee, displaying the document on a display of the addressee user.

* * * * *